3,255,235
NAPHTHOIC ACID ESTERS
Aubert Y. Coran, Charleston, W. Va., and Constantine E. Anagnostopoulos, Kirkwood, Mo., assignors to Monsanto Company, a corporation of Delaware
No Drawing. Filed June 15, 1962, Ser. No. 202,663
12 Claims. (Cl. 260—469)

The present invention relates to a new and useful class of organic compounds. More particularly, this invention is concerned with substituted phenyl esters of certain mono- and polycarboxylic naphthoic acids.

The compounds of this invention are characterized by the following formula:

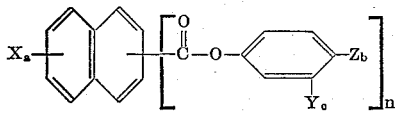

wherein:
$a$ is an integer from 0 to 2;
X is selected from the group consisting of chlorine, bromine, alkyl of 1 to 18 carbon atoms, and alkoxy of 1 to 18 carbon atoms;
$n$ is an integer from 1 to 4;
$b$ and $c$ are unlike integers selected from 0 and 1;
Y is selected from the group consisting of alkoxy of 1 to 18 carbons, and phenoxy; and
Z is selected from the group consisting of phenyl,

and

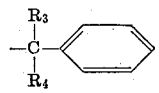

where R, $R_1$ and $R_2$ are alkyl of 1 to 21 carbon atoms, the sum of $R+R_1+R_2$ is up to 23 carbon atoms, and $R_3$ and $R_4$ are alkyl of 1 to 4 carbon atoms.

The compounds of this invention can be prepared by reacting a halide of a naphthalene mono- or poly-carboxylic acid with an appropriate substituted phenol such as a para-alkylphenol or a meta-alkoxyphenol.

Specific examples of substituted phenols which are employed in the preparation of the compounds of this invention are 4-t-butylphenol, 4-t-amylphenol, 4-(1,1,3,3-tetramethylbutyl)phenol, 4-(1-ethyl - 1 - methylpentyl)-phenol, 4-α-cumylphenol, 3-methoxyphenol, 3-butoxyphenol, 3-octadecoxyphenol, 3-phenoxyphenol, and the like. Other substituted phenols which are used are those produced by the reaction of phenol with a tertiary alkyl halide or with a mixture of such alkyl halides. Phenol is also reacted with branched chain olefins or mixtures thereof to produce the substituted phenols. The olefins which are employed are those wherein there is at least one branch on one of the carbon atoms of a double bond, as in the case of isobutylene and diisobutylene. The position of the unsaturation is generally immaterial, and one can employ alpha olefins as well as olefins in which the double bond is remotely disposed with respect to the terminal carbon atoms.

The polymers of propylene having a total number of carbon atoms of from 6 to 24, and the polymers of butylene having a total number of carbon atoms of from 8 to 24, are generally well suited for the preparation of the alkylphenols which are useful in the preparation of the compounds of this invention. For example, one can employ propylene dimer, propylene trimer, propylene tetramer, propylene pentamer, propylene hexamer, propylene octamer, isobutylene dimer, butylene trimer, butylene tetramer, butylene pentamer, etc. The alkylphenols which are derived from propylene polymers having from 6 to 24 carbon atoms are a preferred class of alkylphenols to be used in the preparation of the compounds of this invention. The propylene polymers which are used in the preparation of these alkylphenols are available commercially and, in general, boil within the range of 115° C. to 350° C. Such alkylphenols, as well as the other alkylphenols contemplated herein, can be prepared by methods well known to those skilled in the art. One method of preparing the alkylphenols from propylene polymers is described in U.S. 2,865,966. The class of alkylphenols are preferably prepared according to the methods disclosed in U.S. application Serial No. 21,872, filed April 13, 1960, now abandoned; U.S. application Serial No. 44,439, filed July 21, 1960; and U.S. application Serial No. 44,464, filed July 21, 1960.

Such terms as "propylene trimer" or "propylene tetramer," as used herein, shall be understood to refer to those hydrocarbons present in the product resulting from polymerization of propylene. Since such as polymerization reaction does not proceed so smoothly or accurately as to yield only exact tri or tetra multiples of the propylene feed, it should be clear that these terms are meant to be descriptive of the hydrocarbons present in the polymer product and boiling respectively within the $C_9$ and $C_{12}$ olefin boiling ranges, which ranges embrace the boiling points of the various isomeric $C_9$ and $C_{12}$ polymeric hydrocarbons present therein. Such a construction should also be given to the terms used to describe the other propylene polymers and the butylene polymers. It will be understood that the alkylphenols prepared from these polymers will be predominantly those wherein the alkyl group is connected to the nucleus by a tertiary carbon atom.

The naphthoic acid halides which are employed in preparing the esters of this invention are those wherein the acid precursor contains from 1 to 4 carboxyl groups. Illustrative of such acids are the monocarboxylics, such as 1-naphthoic acid,
2-naphthoic acid,
2-chloro-1-naphthoic acid,
4-chloro-1-naphthoic acid,
5-bromo-1-naphthoic acid,
6-bromo-2-methoxy-1-naphthoic acid,
7-methyl-1-naphthoic acid,
4-methoxy-1-methyl-1-naphthoic acid,
4-butoxy-1-naphthoic acid,
4,7-dimethyl-1-naphthoic acid,
4-n-decyloxy-1-naphthoic acid,
6-isopropyl-1-naphthoic acid,
3,6-di-t-butyl-1-naphthoic acid,
4-n-octadecyloxy-1-naphthoic acid,
6-isopropyl-4-methyl-1-naphthoic acid,
4-t-butyl-2-naphthoic acid,
4-bromo-1-methoxy-2-naphthoic acid,
1,6-dibromo-2-naphthoic acid,
3-ethoxy-2-naphthoic acid,
5-chloro-6-nonyloxy-2-naphthoic acid,
3,7-dimethoxy-2-naphthoic acid,
6-methoxy-5-methyl-2-naphthoic acid,
6-hexyl-2-naphthoic acid,
4-dodecyl-2-naphthoic acid,
5-bromo-6-hexadecyloxy-2-naphthoic acid, and the like;

the dicarboxylics, such as 1,2-naphthalene dicarboxylic acid,
1,3-naphthalene dicarboxylic acid,
1,4-naphthalene dicarboxylic acid, 1,5-naphthalene dicarboxylic acid,
1,6-naphthalene dicarboxylic acid,
1,7-naphthalene dicarboxylic acid,
1,8-naphthalene dicarboxylic acid,
2,3-naphthalene dicarboxylic acid,
2,6-naphthalene dicarboxylic acid,
2,7-naphthalene dicarboxylic acid,
4-methyl-1,2-naphthalene dicarboxylic acid,
5-methyl-1,2-naphthalene dicarboxylic acid,
4,7-dimethyl-1,2-naphthalene dicarboxylic acid,
6-methoxy-3-methyl-1,2-naphthalene dicarboxylic acid,
4-methoxy-1,3-naphthalene dicarboxylic acid,
6-bromo-4-methoxy-1,3-naphthalene dicarboxylic acid,
6-chloro-4-methoxy-1,3-naphthalene dicarboxylic acid,
3,6-diisopropyl-1,4-naphthalene dicarboxylic acid,
4,8-dichloro-1,5-naphthalene dicarboxylic acid,
1-chloro-2,3-naphthalene dicarboxylic acid,
1,4-dimethoxy-2,3-naphthalene dicarboxylic acid,
3,6-dimethoxy-2,7-naphthalene dicarboxylic acid, and the like;

and the tricarboxylics and tetracarboxylics, such as 1,2,3-naphthalene tricarboxylic acid,
1,2,4-naphthalene tricarboxylic acid,
1,2,5-naphthalene tricarboxylic acid,
1,2,8-naphthalene tricarboxylic acid,
1,3,6-naphthalene tricarboxylic acid,
1,3,8-naphthalene tricarboxylic acid,
1,4,5-naphthalene tricarboxylic acid,
4,7-dimethyl-1,3,6-naphthalene tricarboxylic acid,
1,2,3,4-naphthalene tetracarboxylic acid,
1,2,4,5-naphthalene tetracarboxylic acid,
1,4,5,8-naphthalene tetracarboxylic acid,
2,3,6,7-naphthalene tetracarboxylic acid,
2-chloro-1,4,5,8-naphthalene tetracarboxylic acid,
2-methoxy-1,4,5,8-naphthalene tetracarboxylic acid,
2,6-dichloro-1,4,5,8-naphthalene tetracarboxylic acid, and the like.

The preparation of several exemplary naphthoic acid esters of this invention is hereinafter set forth in detail. It is to be understood that such specific examples are illustrative only and should not be construed as limiting the invention in any manner.

*Example I*

This example describes the preparation of 4-nonylphenyl 1-naphthoate from a $C_9$-alkylphenol, distillation range (5 mm. Hg):

| | Degrees C. |
|---|---|
| First drop | 288 |
| 5–95% | 288–313 |
| End | 316 | whose alkyl substituent is derived from propylene trimer (boiling range 121–138° C.).

A mixture containing 19.06 grams (0.1 mol) of 1-naphthoyl chloride, 22.04 grams (0.1 mol) of said $C_9$-alkylphenol, and 50 ml. of benzene is placed in a suitable flask. The mixture is agitated, and 0.15 mol of triethylamine is added slowly. The resulting mixture is heated to reflux and is held there for about one hour. The reaction mixture is then washed once with a dilute aqueous solution of HCl, and with distilled water, until a test shows that said mixture is neutral. The water and benzene are distilled off, and the product is filtered. There is obtained a 95% yield of 4-nonylphenyl 1-naphthoate.

*Example II*

Following the procedure of Example I, 2-naphthoyl chloride is employed as the halide reactant. There is obtained a 96.5% yield of 4-nonylphenyl 2-naphthoate, $n_D^{25}=1.4528$.

*Example III*

Following the procedure of Example I, the phenol reactant employed is derived from propylene pentamer (boiling range, 260–265° C.). There is obtained a 95% yield of 4-pentadecylphenyl 1-naphthoate.

The procedure described in Example I is repeated with the phenols and naphthoyl halides hereinafter set forth. The molar proportions are as previously employed, and the naphthoic acid esters are obtained in yields of about 95–98%.

*Example IV*

Phenol: $C_{13}$-alkylphenol derived from a propylene polymer mixture (boiling range, 200–260° C.) containing an average of 13 carbon atoms.
Halide: 1-naphthoyl chloride.
Ester: 4-tridecylphenyl 1-naphthoate.

*Example V*

Phenol: $C_{18}$-alkylphenol derived from propylene hexamer (boiling range, 260–290° C.).
Halide: 2-naphthoyl chloride.
Ester: 4-octadecylphenyl 2-naphthoate.

*Example VI*

Phenol: $C_{21}$-alkyphenyl derived from a propylene polymer mixture (boiling range, 295–325° C.) containing an average of 21 carbon atoms and consisting chiefly of propylene hexamer and propylene octamer.
Halide: 1-naphthoyl chloride.
Ester: 4-heneicosylphenyl 1-napthoate.

*Example VII*

A mixture containing 25.3 grams (0.1 mol) of 2,7-napthalenedicarbonyl chloride, 41.26 grams (0.2 mol) of 4-(1,1,3,3-tetramethylbutyl)phenol, and 50 ml. of benzene is charged to a suitable flask. This mixture is agitated, and 0.3 mol of triethylamine is added slowly. The resulting mixture is heated to reflux and is held there for about one hour. The reaction mixture is then washed once with a dilute aqueous solution of HCl, and with distilled water, until a test shows that the mixture is neutral. The water and benzene are distilled off, and the product is recrystallized from a chloroform-methanol solution. There is obtained an 82% yield of bis-[4-(1,1,3,3-tetramethylbutyl)phenyl]napthalene - 2,7 - dicarboxylate, M.P. 208–212° C.

*Example VIII*

Following the procedure of Example VII, 1,4-napthalenedicarbonyl chloride is employed as the halide reactant. There is obtained a 79% yield of bis-[-4-(1,1,3,3-tetramethylbutyl)phenyl]napthalene - 1,4 - dicarboxylate, M.P. 131.5–133° C.

The procedure described in Example VII is repeated with the phenols and dihalides hereinafter set forth. The molar proportions are as previously employed, and the naphthoic acid esters are obtained in yields of about 75–85%.

*Example IX*

Phenol: 3-ethoxyphenol.
Halide: 1,3-naphthalenedicarbonyl chloride.
Ester: bis - (3 - ethoxyphenyl)naphthalene - 1,3 - dicarboxylate.

*Example X*

Phenol: 4-(1-ethyl-1-methylphenyl)phenol.
Halide: 1,5-naphthalenedicarbonyl chloride.
Ester: bis-[4-(1-ethyl-1 - methylpentyl)phenyl]napthalene-1,5-dicarboxylate.

*Example XI*

Phenol: 3-dodecycloxyphenol.
Halide: 6-chloro-1,4-naphthalenedicarbonyl chloride.
Ester: bis-(3-dodecyloxypheny) 6-chloronaphthalene-1,4-dicarboxylate.

Example XII

Phenol: 4-t-butylphenol.
Halide: 1-methyl-2,5-napthalenedicarbonyl chloride.
Ester: bis-(4-t-butylphenyl) 1-methylnaphthalene-2,5-dicarboxylate.

Example XIII

Phenol: 4-α-cumylphenol.
Halide: 1,7-naphthalenedicarbonyl chloride.
Ester: bis-(4-α-cumylphenyl)napthalene-1,7-dicarboxylate.

The procedure described in Example VII is further repeated with the phenols and the tri or tetrahalides hereinafter set forth. It will be apparent that the molar ratio of phenol to halide will be 3:1 or 4:1, depending upon the number of acid halide groups on the napthalene nucleus.

Example XIV

Phenol: 4-t-butylphenol.
Halide: 1,3,6-naphthalenetricarbonyl chloride.
Ester: tris-(4-t-butylphenyl)naphthalene-1,3,6-tricarboxylate.

Example XV

Phenol: 4-t-amylphenol.
Halide: 1,3,8-naphthalenetricarbonyl chloride.
Ester: tris-(4-t-amylphenyl)napthalene-1,3,8-tricarboxylate.

Example XVI

Phenol: 3-methoxyphenol.
Halide: 1,2,4,5-naphthalentetracarbonyl chloride.
Ester: tetra-(3-methoxyphenyl)naphthalene-1,2,4,5-tetracarboxylate.

Example XVII

Phenol: 4-(1,1-dimethylbutyl)phenol.
Halide: 2-chloro-1,4,5,8-naphthalenetetracarbonyl chloride.
Ester: tetra-[4-(1,1-dimethylbutyl)phenyl]-2-chloronaphthalene-1,4,5,8-tetracarboxylate.

Example XVIII

A mixture containing 19.06 grams (0.1 mol) of 1-naphthoyl chloride, 15.02 grams (0.1 mol) of 4-t-butylphenol, and 50 ml. of benzene is placed in a suitable flask. The mixture is agitated, and 0.15 mol of triethylamine is added slowly. The resulting mixture is heated to reflux and is held there for about one hour. The reaction mixture is then washed with a dilute aqueous solution of HCl, and with distilled water, until a test shows that said mixture is neutral. The water and benzene are distilled off, and the product is recrystallized from a benzene-methanol solution. There is obtained an 80% yield of 4-t-butylphenyl 1-naphthoate, M.P. 104° C.

Example XIX

Following the procedure of Example XVIII, 2-naphthoyl chloride is employed as the halide reactant. The product is recrystallized from methanol, and there is obtained 4-t-butylphenyl 2-naphthoate, M.P. 124–125° C.

Example XX

Following the procedure of Example XVIII, the reactants employed are x,x'-di-t-butyl-x''-naphthoyl chloride and 3-phenoxyphenol. There is obtained 3-phenoxyphenyl x,x'-di-t-butyl-x''-naphthoate as a resinous product.

Example XXI

Following the procedure of Example XVIII, the reactants employed are x,x',-di-t-butyl-x''-naphthoyl chloride and 4-phenylphenol. The product is recrystallized from a chloroform-methanol solution, and there is obtained a 78% yield of 4-phenylphenyl x,x'-di-t-butyl-x''-naphthoate, M.P. 176–179° C.

Example XXII

Following the procedure of Example VII, 0.1 mol of the phenol is used, and 1-naphthoyl chloride is employed as the halide reactant. There is obtained an 80% yield of 4-(1,1,3,3-tetramethylbutyl)phenyl 1-naphthoate, M.P. 121, 118° C. (polymorphic).

The procedures detailed above are followed employing the phenols and halides hereinafter set forth. The molar ratios of the reactants will be dependent upon the number of acid halide groups on the naphthalene nucleus, and the ester products are obtained in good yield.

Example XXIII

Phenol: 3-t-butoxyphenol.
Halide: 1,6-dibromo-2-naphthoyl chloride.
Ester: 3-t-butoxyphenyl 1,6-dibromo-2-naphthoate.

Example XXIV

Phenol: $C_9$-alkylphenol (as in Example I).
Halide: 1,4,5-naphthalenetricarbonyl chloride.
Ester: tris-(4-nonylphenyl)naphthalene-1,4,5-tricarboxylate.

Example XXV

Phenol: 4-α-cumylphenol.
Halide: 6-isopropyl-4-methyl-1-naphthoyl chloride.
Ester: 4-α-cumylphenyl 6-isopropyl-4-methyl-1-naphthoate.

Example XXVI

Phenol: 4-t-butylphenol.
Halide: 4-dodecyl-2-naphthoyl chloride.
Ester: 4-t-butylphenyl 4-dodecyl-2-naphthoate.

Example XXVII

Phenol: $C_{15}$-alkylphenol (as in Example III).
Halide: 4,8-dichloro-1,5-naphthalenedicarbonyl chloride.
Ester: bis-(4-pentadecylphenyl)-4,8-dichloronaphthalene-1,5-dicarboxylate.

Example XXVIII

Following the procedure of Example XXII, 2-naphthoyl chloride is employed as the halide reactant. The product is recrystallized from an acetone-methanol solution, and there is obtained 4-(1,1,3,3-tetramethylbutyl)phenyl 2-naphtholate, M.P. 102–104° C.

Example XXIX

Following the procedure of Example XXII, the reactants employed are 1-methyl-x-naphthoyl chloride and 3-n-octadecyloxyphenol. The product is recrystallized from a benzene-methanol solution, and there is obtained 3-n-octadecyloxyphenyl 1-methyl-x-naphthoate, M.P. 72.5–73.5° C.

Example XXX

Following the procedure of Example XXII, the reactants employed are x-chloro-1-naphthoyl chloride and 4-α-cumylphenol. The product is recrystallized from acetone, and there is obtained 4-α-cumylphenyl x-chloro-1-naphthoate, M.P. 113–114° C.

It should be pointed out that the alkylphenols employed in preparing the compounds of this invention need not necessarily be pure para or meta compounds. It will be apparent that, during the alkylation of the phenols, some isomeric material will be formed. Although it is preferred to employ alkylphenols which comprise only the single desired isomer, the presence of relatively minor amounts of other isomers does not have any significant adverse effect. For example, the alkylphenols which are derived from propylene and butylene polymers (e.g., Example I) can be employed with a para to ortho ratio of 4:1. When isomeric mixtures are used, it is preferred that the para to ortho ratio be at least about 6:1.

The naphthoic acid esters of this invention have been found to be effective stabilizers for polymeric materials.

Said esters are especially effective as ultraviolet light stabilizers for polyolefins such as polyethylene, polypropylene, and the like. From the standpoint of optimum effectiveness, readily available starting materials, and commercial practicality, a particularly preferred group of esters is characterized by the formula, $$X_a \text{-[naphthyl]-}\left[\overset{O}{\underset{\|}{C}}\text{-O-[phenyl]-}Z\right]_n$$

wherein:

$a$ is an integer from 0 to 2;

X is selected from the group consisting of chlorine, alkyl of 1 to 4 carbon atoms, and alkoxy of 1 to 4 carbon atoms;

Z is selected from the group consisting of α-cumyl and $$-\underset{\underset{R_2}{|}}{\overset{\overset{R}{|}}{C}}-R_1$$

where R, $R_1$ and $R_2$ are alkyl of 1 to 21 carbon atoms, and the sum of $R+R_1+R_2$ is up to 23 carbons atoms; and $n$ is an integer from 1 to 2, provided that when $n$ is 2, the carboxyl groups are on non-adjacent carbon atoms of the naphthalene nucleus.

As illustrative of the stabilizing action of the naphthoic acid esters of this invention, polyethylene (average molecular weight of about 20,000) films (5 mils thicks) containing 1% by weight of said esters exhibit remarkable stability to the degradative effects of ultraviolet light. For example, 5-mil films containing 1.0% concentration of the following esters:

(A) 4-t-butylphenyl 1-naphthoate,
(B) 4-(1,1,3,3-tetramethylbutyl)phenyl 2-naphthoate,
(C) 4-α-cumylphenyl x-chloro-1-naphthoate, were exposed to ultraviolet light in a specially designed apparatus. Said apparatus comprises a chamber having an exhaust fan mounted therein and having a number of spaced, air intake openings. A horizontal turntable is mounted in said chamber, and an artificial source of ultraviolet light is suspended above the center of the turntable. A plurality of vertical brackets is spaced around the perimeter of the turntable, and the films to be tested are attached to said brackets substantially in the plane of the ultraviolet source.

The test films, and control films, were exposed to the ultraviolet source at a distance of 5 inches. At the end of the exposure period, the films were analyzed for carbonyl content, which is a measure of degradation. Carbonyl content is determined by measurement of the infrared absorption in the 5.82 millimicron region and is expressed as mols×$10^4$ per liter. The results obtained are tabulated below.

| Additive | Hours Exposed | Carbonyl Content |
|---|---|---|
| None | 95 | 141 |
| Ester (A) | 95 | 43 |
| Ester (B) | 95 | 36 |
| None | 200 | 340 |
| Ester (A) | 200 | 227 |
| Ester (B) | 200 | 164 |
| None | 90 | 98 |
| Ester (C) | 90 | 53 |
| None | 210 | 280 |
| Ester (C) | 210 | 178 |

Similar results are obtained when the other naphthoic acid esters of this invention are tested in the above manner.

The amount of the ester of this invention employed in any polymer composition can be varied widely, depending upon the particular polymer, the thickness of the polymer article, and the use for which the article is intended. Concentrations of the esters of from about 0.001% to 10% by weight of the polymer can be used, with concentrations of 0.1% to 3% being preferred.

The naphthoic acid esters can be used in polymer compositions containing the common additives such as pigments, fillers, heat stabilizers. They can also be used in combination with known light stabilizers.

While this invention has been described with respect to certain embodiments, it is not so limited, and it is to be understood that variations and modifications thereof may be made without departing from the spirit or scope of this invention.

The embodiment of the invention in which an exclusive property or privilege is claimed are defined as follows:

1. A compound of the formula, $$X_a\text{-[naphthyl]-}\left[\overset{O}{\underset{\|}{C}}\text{-O-[phenyl}(Y_c)\text{]-}Z_b\right]_n$$

wherein:

$a$ is an integer from 0 to 2;

X is selected from the group consisting of chlorine, bromine, alkyl of 1 to 18 carbon atoms, and alkoxy of 1 to 18 carbon atoms;

$n$ is an integer from 1 to 4;

$b$ and $c$ are unlike integers selected from 0 and 1;

Y is selected from the group consisting of alkoxy of 1 to 18 carbon atoms, and phenoxy; and Z is selected from the group consisting of phenyl, $$-\underset{\underset{R_2}{|}}{\overset{\overset{R}{|}}{C}}-R_1$$

and $$-\underset{\underset{R_4}{|}}{\overset{\overset{R_3}{|}}{C}}-\text{[phenyl]}$$

where R, $R_1$ and $R_2$ are alkyl of 1 to 21 carbon atoms, the sum of $R+R_1+R_2$ is up to 23 carbon atoms, and $R_3$ and $R_4$ are alkyl of 1 to 4 carbon atoms.

2. 4-(1,1,3,3-tetramethylbutyl)phenyl 2-naphthoate.
3. 4-(1,1,3,3-tetramethylbutyl)phenyl 1-naphthoate.
4. 4-t-butylphenyl 2-naphthoate.
5. 4-t-butylphenyl 1-naphthoate.
6. Bis-[4-(1,1,3,3 - tetramethylbutyl)phenyl]naphthalene-2,7-dicarboxylate.
7. Bis-[4-(1,1,3,3 - tetramethylbutyl)phenyl]naphthalene-1,4-dicarboxylate.
8. A compound of the formula $$\text{[naphthyl]-}\overset{O}{\underset{\|}{C}}\text{-O-[phenyl]-}\underset{\underset{R_2}{|}}{\overset{\overset{R}{|}}{C}}-R_1$$

where R, $R_1$ and $R_2$ are alkyl of 1 to 21 carbon atoms, and the sum of $R+R_1+R_2$ is up to 23 carbon atoms.

9. A compound of the formula $$\text{[naphthyl]-}\left[\overset{O}{\underset{\|}{C}}\text{-O-[phenyl]-}\underset{\underset{R_2}{|}}{\overset{\overset{R}{|}}{C}}-R_1\right]_2$$

where R, $R_1$ and $R_2$ are alkyl of 1 to 21 carbon atoms, the sum of $R+R_1+R_2$ is up to 23 carbon atoms, and the carboxyl groups are on non-adjacent carbon atoms of the naphthalene nucleus.

10. A compound of the formula $$\text{[naphthyl]-}\left[\overset{O}{\underset{\|}{C}}\text{-O-[phenyl]-}\underset{\underset{CH_3}{|}}{\overset{\overset{CH_3}{|}}{C}}-CH_2-\underset{\underset{CH_3}{|}}{\overset{\overset{CH_3}{|}}{C}}-CH_3\right]_2$$

the carboxyl groups being on non-adjacent carbon atoms of the naphthalene nucleus.

11. 4-nonylphenyl 2-naphthoate, wherein the nonylphenyl group is the residue upon removal of hydrogen of the hydroxyl substituent of the nonylphenol obtained by condensing propylene trimer with phenol.

12. 4-nonylphenyl 1-naphthoate, wherein the nonylphenyl group is the residue upon removal of hydrogen of the hydroxyl substituent of the nonylphenol obtained by condensing propylene trimer with phenol.

References Cited by the Examiner
UNITED STATES PATENTS

| | | | |
|---|---|---|---|
| 2,138,809 | 11/1938 | Reiff et al. | 260—475 |
| 2,799,695 | 7/1957 | Taves | 260—456 |

LORRAINE A. WEINBERGER, *Primary Examiner.*

HAROLD G. MOORE, *Examiner.*

R. K. JACKSON, T. L. GALLOWAY, *Assistant Examiners.*